Patented Jan. 6, 1942

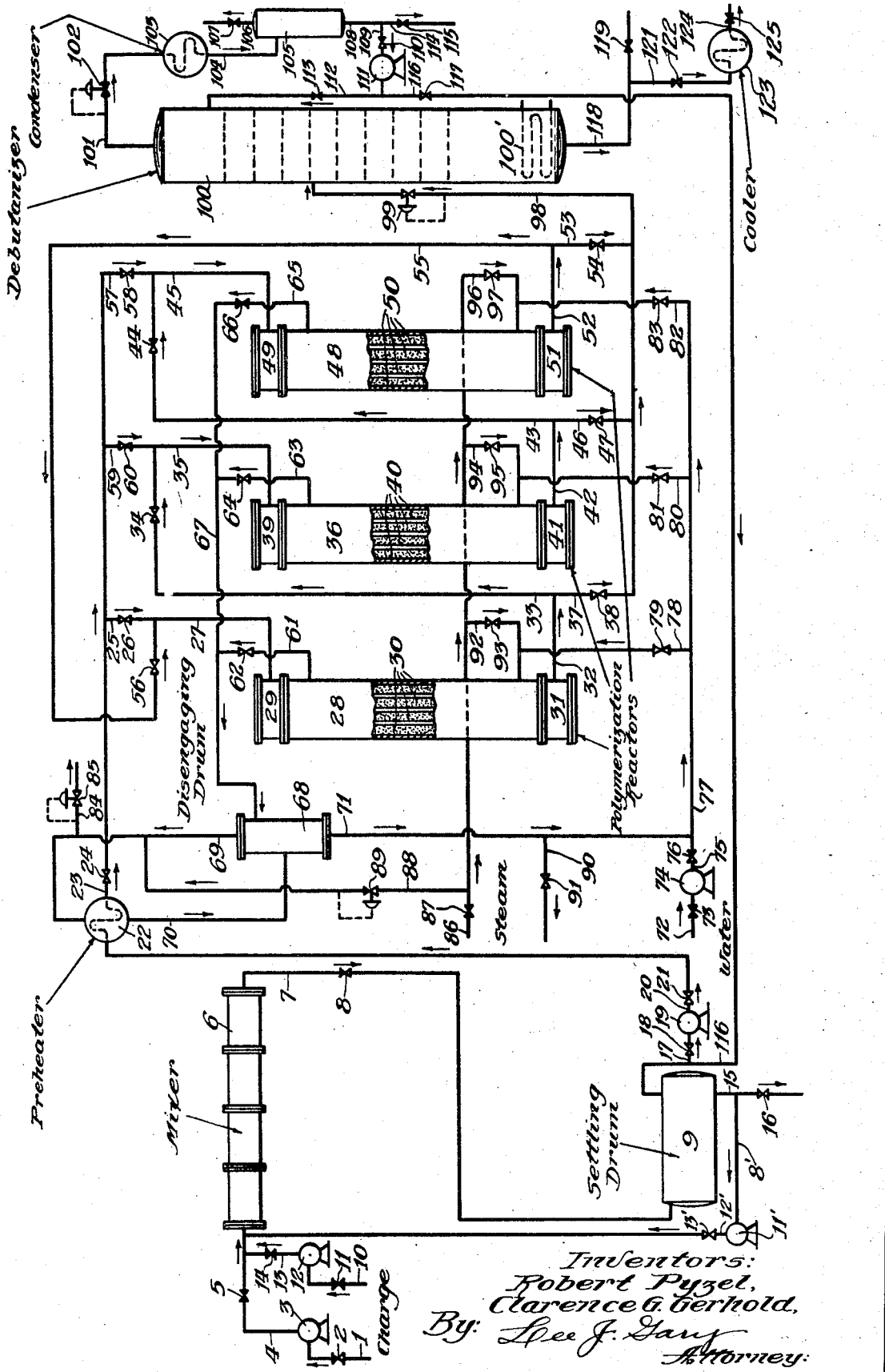

2,268,618

UNITED STATES PATENT OFFICE 2,268,618

POLYMERIZATION OF HYDROCARBONS

Robert Pyzel and Clarence G. Gerhold, Chicago, Ill., assignors to Universal Oil Products Company, Chicago, Ill., a corporation of Delaware Application December 23, 1937, Serial No. 181,288

2 Claims. (Cl. 260—683)

This invention relates more particularly to the polymerization of normally gaseous olefins and specifically to the mixed or interpolymerization of the normal and iso-butenes present in closecut hydrocarbon fractions produced by the secondary fractionation of the overhead fractions from cracking plant stabilizers comprising principally hydrocarbons of 3 and 4-carbon atoms to the molecule. The closecut fractions which it is desired to treat are known in the art as "B—B" fractions.

The invention is more specifically concerned with the use of particular types of catalysts which are effective under controlled operating conditions to produce mixed polymers of normal and iso-butenes which may be varied in their characteristics by varying the relative proportions of the normal and the iso-compounds which undergo polymerization. The products of the process consist largely of octenes which are of an isomeric character and which are readily hydrogenatable to form mixtures of iso-octanes which are comparable in their antiknock properties with the standard 2,2,4-trimethyl pentane which is used as a standard of reference in rating the antiknock value of motor fuels. The process is also applicable to mixtures of 4-carbon atom hydrocarbons containing varying percentages of olefins produced in any other manner, such as, for example, the dehydration of butyl alcohols or the partial or complete dehydrogenation or cracking of butanes.

The iso-paraffins and particularly the iso-octanes are at present a very desirable fuel for aviation engines on account of their high antiknock value, medium boiling range and stability in respect to gummy and resinous deposits which may cause trouble in fuel feed systems. They are also sought after as blending fluids for increasing the antiknock value of motor fuels which are below grade in this respect. The present process permits the maximum utilization of the 4-carbon atom olefins in the aforesaid "B—B" fractions for the production of octene mixtures in which the major constituents consist to a large extent of 2,2,4-trimethyl pentene and 2,2,3-trimethyl pentene, both hydrogenatable to iso-octanes of high antiknock value, although the exact determination of the relative proportions of the different isomers is difficult.

In one specific embodiment the present invention comprises the processing of butane-butene mixtures for the production of octene mixtures by the following series of steps:

1. Preliminary treatment to remove impurities deleterious to the catalysts employed to effect the polymerization of the butenes. This usually involves washing of the liquid fractions with basic aqueous solutions and in general aqueous solutions having an alkaline reaction and of controlled concentration.

2. Subjecting the purified charge under conditions of temperature and pressure corresponding to a "critical phase" to contact with phosphoric acid-containing catalysts disposed in reactors which provide for removal of reaction heat, to effect a controlled degree of mixed polymerization of the normal and isobutenes.

3. Fractionating the efflux from the polymerizing step to separate the polymers from the residual butanes and unreacted butenes.

4. Returning residual butanes (including unreacted butenes) to the charge, if required, to reduce the butene content of the mixture passing over the catalyst.

If desired the debutanized polymers may be further fractionated to produce an overhead isooctene fraction and a bottom product of heavier polymers.

The foregoing brief outline of the character and steps of the process will be amplified by describing a typical operation in connection with the attached drawing which shows diagrammatically, by the use of conventional figures generally in side elevation, an arrangement of equipment in which the object of the process may be accomplished. The units and connections shown in the drawing are not to any exact or relative scale and are not intended to limit the scope of the invention.

Referring to the drawing butane-butene fractions are admitted under sufficient pressure to maintain them in liquid phase at ordinary temperatures to a charging pump 3 by way of a line 1 containing a valve 2 and are discharged through a line 4 containing a valve 5 through a mixer 6 which may comprise a succession of perforated plates or any other type of internal structure which will insure turbulence. Wash liquids which usually comprise moderately concentrated solutions of caustic soda of from approximately 5–15° Bé. in gravity are admitted through line 10 containing valve 11 to a pump 12 which discharges through line 13 containing valve 14 into line 4 preceding the mixer. The impurities commonly encountered in butane-butene fractions from cracking processes operating upon different types of petroleum oils and their fractions are usually removed by this treatment to a sufficient degree to adequately protect the life of the catalysts. If water washing or the use of weak acids are found necessary to supplement the treatment with caustic soda, these steps may be employed without departing from the scope of the invention, although a single washing step is all that is shown in the drawing.

The mixture of hydrocarbons and washing fluids passes through line 7 containing valve 8 to a settling drum 9 which has a drawoff line 15 containing a valve 16 for the removal of spent or partially spent washing fluids. If found advantageous, the amount of washing fluid which is passed through the mixer in admixture with the hydrocarbons may be increased without increasing the amount of fluid used by the process by recirculating the washing fluid which settles in drum 9 to the inlet line 4 of mixer 6 through line 8', pump 11', and line 12' containing valve 13'.

The purified hydrocarbon charge passes through line 17 and valve 18 to a pump 19 which discharges through line 20 containing a valve 21 through a preheater 22 wherein the temperature is raised to the optimum point for initiating the polymerization of the olefins. Steam passes to the preheater 22 and condenses in indirect contact with the charge in the preheater under a pressure corresponding to the optimum temperature of treatment. The source of the steam at this point will be described later in connection with the system of temperature control.

The preheated charge is now passed under suitable pressure to a polymerizing treatment in reactors containing polymerizing catalyst. Among preferred catalysts are precalcined mixtures of phosphoric acids and adsorbents, the latter preferably being of a siliceous character and comprising such materials as certain clays of the montmorillonite and bentonite type (either raw or acid treated), kieselguhr, precipitated silica, and other siliceous and refractory materials. Granular catalysts may be prepared by making a paste for example of kieselguhr and a major proportion by weight of ortho or pyrophosphoric acid, calcining the mixture at temperatures from approximately 300–400° C. to produce a cake, grinding and sizing the cake to produce particles of a convenient size, usually from about 4–20 mesh and if necessary subjecting the sized particles to the action of superheated steam at about 265° C. (510° F.) and atmospheric pressure to bring the active catalytic acid to a state of hydration corresponding to maximum efficiency. The above procedure may be modified by extruding and forming the original pasty material and calcining the performed particles.

The optimum utilization of both the normal and the iso-butenes in the butane-butene mixtures to produce high antiknock iso-octane requires the maximum cross-polymerization of iso and normal butenes with the minimum separate polymerization of normal or iso-butenes. It has been found that temperatures and pressures must be defined within relatively close limits in order that the iso-octenes produced by the polymerization may be hydrogenated to high antiknock iso-octanes. The temperatures at which the reaction is preferably initiated fall within the approximate range of 110–185° C. (230–365° F.). During the reaction the temperature is maintained at from 240 to 420° F. and the pressures are of the order of 490–750 lbs. per square inch or higher. At higher temperatures and lower pressures the polymerization will produce apparently satisfactory iso-octenes, but when these are hydrogenated the iso-octanes will be of lower antiknock value.

The reactions of polymerization of olefins are exothermic and in order to secure best results means must be provided for abstracting evolved heat to prevent excessive temperature rise in the catalyst zone. Two systems of temperature control may be employed in the process. Thus, (a) the polymerizing catalyst may be contained in banks of tubes of relatively small diameter which are surrounded by a cooling medium (such as evaporating water) in suitably constructed reactors, and (b) a part of the butanes (possibly containing small percentages of butenes) which are separated from the polymer product after polymerization has taken place, may be returned to the butane-butene charge, thereby reducing the relative amount of reacting hydrocarbons and increasing the relative amount of non-reacting hydrocarbons in the material passing over the polymerizing catalyst.

The effect of cooling as described under (a) above generally controls the average temperature at which the catalyst operates, while the effect of (b) above is to locally avoid the temperature rise of the catalytic surfaces of the catalyst particles by providing relatively large quantities of inert material (butanes) as heat absorbing material at the point where the reaction takes place. The step (b) may be necessary only in cases where the available charging stock is relatively high in butene content.

A number of reactors may be employed in either series or parallel connection and it is usually found better to employ a series which is connected so that individual reactors may be segregated when the catalyst has become spent, in order to replace such spent catalyst while employing other reactors, in which the catalyst has sufficient activity, to continue operation. Three such reactors are indicated in the drawing in both series and parallel connection.

From preheater 22 the charge flows through line 23 containing valve 24 and may follow line 25 containing valve 26 and line 27 to enter the upper section 29 of reactor 28 and pass downwardly through the tubes 30 containing the polymerizing catalyst into lower space 21 from which the polymerized olefins in admixture with butanes and butenes leave through line 32, and pass either into line 33 containing valve 34 which permits passage of the partially treated materials through line 35 to reactor 36 or line 37 containing valve 38 leading directly to the succeeding stabilizing step through line 98 containing pressure control valve 99 which may be automatic.

Reactor 36 may be of the same construction as reactor 28, containing the same open distributing space 39 at the top, catalyst-containing tubes 40 and lower collecting space 41 from which the reacted hydrocarbons and mixtures of butanes and butenes leave through line 42 and pass either through line 43 containing valve 44 to line 45 and thence to reactor 48 or through line 46 containing valve 47 to the succeeding stabilizing step through line 98 containing valve 99.

Line 45 permits the passage of the charge to reactor 48 which is of the same construction as reactors 28 and 36 with respect to upper free space 49, catalyst-containing tubes 50, and lower open space 51 from which polymerized products and mixtures of butanes and butenes pass through line 52 and either through line 53 containing valve 54 to the succeeding stabilizing step through line 98 and valve 99, or back to line 27 by way of recirculating line 55 containing valve 56, in case reactor 48 is the first of the series at some stage in the operation of the plant. In this case valve 26 in line 25 will be closed and valve 58 in line 57 will be open. Reactor 36 is also directly connected to charge line 23 by line 59 containing valve 60. The connections shown enable the use of the polymerization reactors in any order in a general direction from left to right as shown in the drawing, and this same general system of operation may be applied to any number of reactors although only three are shown.

The system of controlling temperature in the reactors may consist of surrounding the tubes with boiling water, the evaporation being maintained by the heat of reaction. The steam generated in the reactors passes through lines 61, 63 and 65, containing valves 62, 64 and 66, respectively, through line 67 into disengaging drum 68. In this drum any water carried by the steam is separated from the steam. The steam passes from the drum 68 through line 69 to preheater 22. The heat required for preheating the charge is extracted from the steam resulting in its condensation. The water so formed returns by gravity through line 70 to drum 68. The water flows from drum 68 through line 71 into line 77. Water required for the original filling of the reactors, or make-up water enters the system through line 72 containing valve 73 and leading into pump 74 which discharges into line 75 containing valve 76 and leading to line 77. The water may flow from line 77 into reactors 28, 36 and 48 through lines 78, 80 and 82 containing valves 79, 81 and 83 respectively.

The reactor-cooling and charge-preheating system may operate under two alternative conditions. When the quantity of steam generated in reactors 28, 36 and 48 is more than the steam condensed in preheating the charge in preheater 22, the excess steam is discharged through line 84 containing up-stream pressure control valve 85. The amount of water leaving the system in the form of steam through line 84 is replaced by charging an equal amount to the system by means of pump 74.

When the quantity of steam generated in reactors 28, 36 and 48 is less than the steam condensed in preheating the charge in preheater 22, the difference is supplied by adding steam to the system from an outside source through line 86, containing valve 87 and line 88 containing downstream pressure control valve 89. A quantity of water equivalent to the steam entering the system through line 88 and valve 89 is continuously or intermittently withdrawn through line 90 containing valve 91.

The temperature at which the reactors 28, 36 and 48 operate depends on the boiling temperature of the water surrounding the catalyst tubes, and this boiling temperature is adjusted to the desired point by the pressure maintained on the cooling system by means of either valve 85 or valve 89.

In order to start the operation of the process the water in reactors 28, 36 and 48 must be heated to approximately boiling temperature. Heating this water to this temperature may be accomplished by steam injection by means of steam header 86 and branch lines 92, 94 and 96 containing valves 93, 95 and 97 respectively.

It is to be understood that the method of removing reaction heat herein described constitutes the preferred method, but may be replaced by other suitable methods, such as the circulation of relatively large quantities of warm liquid cooling medium. The essential features of the cooling system are that it provides on the one hand for effective removal of reaction heat from the catalyst containing zone, while on the other hand it prevents any substantial sub-cooling of the reaction zone when the catalyst has become partially spent, or generally in any section of the reaction zone wherein the reaction proceeds at a reduced rate.

According to the present process the polymer products which contain major proportions of octenes which may be converted by hydrogenation into high antiknock iso-octanes when operations have been properly conducted, are freed of residual butanes and then may be fractionated to produce fractions consisting principally of octenes. For this purpose the products are first passed to a debutanizer 100 through line 98 containing up-stream pressure control valve 99. Ordinarily the debutanizer will be operated at a pressure of about 100 lbs. per square inch with a top vapor temperature of about 65° C. (150° F.) and a bottom temperature of 196° C. (385° F.) maintained by any type of reboiling coil shown as 100' which may utilize steam or process fluids as may be convenient. The vapors of butanes pass through line 101 containing up-stream pressure control valve 102 and are liquefied during passage through condenser 103 and flow through line 104 into receiver 105 which has a conventional gas release line 106 containing valve 107. Part of the butanes are withdrawn from the receiver through line 108 and are passed through line 109 containing valve 110 to pump 111 which discharges through line 112 containing valve 113 to the top of the debutanizer in sufficient amount to control the character of the overhead product therefrom. Excess butanes are discharged from the process through line 114 containing valve 115. When desired a certain portion of the butane production may be circulated back to the entrance of the polymerization reactors by means of line 116 containing valve 117 in order to maintain the concentration of the butenes in the mixture of butanes and butenes passing over the polymerizing catalyst at a fixed point to control the temperature rise of the catalytic surfaces by controlling the amount of exothermic heat generated relative to the total quantity of material flowing over the catalyst.

The debutanized polymers are withdrawn from the bottom of column 100 to line 118 containing valve 119 and may be further fractionated to produce cuts consisting principally of octenes which may be hydrogenated to produce mixtures of iso-octanes as already mentioned.

If the polymer products are to be stored for some time prior to their further fractionation they may be passed through line 121 containing valve 122 through a cooler 123 and thence to storage through line 124 containing valve 125.

The following example is given to indicate the character of the results obtainable by the use of the process although not with the intent of unduly limiting its scope. The charge to the process consisted of a butane-butene fraction having the following composition:

| | Mol percent |
|---|---|
| i-Butene | 15 |
| n-Butene | 30 |
| Butanes | 55 |

This charge was passed through solid phosphoric acid catalyst contained in the polymerization reactors at an inlet temperature of 146° C. (295° F.) and a pressure of approximately 650 lbs. per square inch. The outlet pressure of the reactors was held at 620 lbs. per square inch. As a result of this operation there was produced an amount of iso-octene fraction equal to 25.7% by volume of the B—B fraction charged and 4.5% by volume of higher boiling polymers. The properties of these two products are given below:

|  | A. P. I. gravity | Boiling range |
| --- | --- | --- |
| i-Octenes | 60.5 | 93–126° C. (200–260° F.) |
| Higher boiling polymers | 45.5 | 171–260° C. (340–500° F.) |

The composition of the exit gases from the polymerizing plant released from the receiver of the primary fractionator and produced in an amount of 66.3% of the charge is shown in the table below:

```
                                    Mol percent
i-Butene_____  1.7
n-Butene_____  8.1
Butanes_____ 90.2
```

The iso-octene fraction produced was hydrogenatable to produce a mixture of iso-octanes which had an A. P. I. gravity of 66, a specific gravity of 0.7165, and an octane rating of 98 compared with the standard 2,2,4-trimethyl pentane.

The nature of the present invention and its practical aspects are evident from the preceding specification and illustrative data although neither section is intended to be unduly limiting.

We claim as our invention:

1. A process for producing octenes by cross polymerization of iso and normal butenes which comprises introducing the butenes into a polymerizing zone containing solid phosphoric acid catalyst, initiating the polymerization reaction in said zone at a temperature of from about 230 to 365° F., maintaining the polymerizing zone in indirect heat exchange with a normally liquid cooling medium of substantially constant boiling point and which undergoes vaporization by heat extracted from the exothermic polymerizing reaction, the temperature within said zone being dependent upon the boiling temperature of said medium, and adjusting the last-named temperature by controlling the pressure on the boiling cooling medium to prevent the temperature in said zone from rising appreciably above 420° F., whereby to effect optimum cross polymerization of the iso and normal butenes.

2. A process for producing octenes by cross polymerization of iso and normal butenes which comprises introducing the butenes into a polymerizing zone containing solid phosphoric acid catalyst and disposed in indirect heat exchange relation with water, initiating the polymerizing reaction in said zone at a temperature of about 230 to 365° F., maintaining the water in boiling condition by heat extracted from the exothermic polymerizing reaction, the temperature in said zone being dependent upon the boiling temperature of the water, and adjusting the last-named temperature by controlling the pressure on the boiling water to prevent the temperature in said zone from rising appreciably above 420° F., whereby to effect optimum cross polymerization of the iso and normal butenes.

ROBERT PYZEL.
CLARENCE G. GERHOLD.